US011267018B2

(12) United States Patent
Herrington (10) Patent No.: US 11,267,018 B2
(45) Date of Patent: Mar. 8, 2022

(54) SHALE SHAKER BUFFER WEAR ITEM AND METHOD FOR USE (71) Applicant: Brett Herrington, Cleveland, TX (US)

(72) Inventor: Brett Herrington, Cleveland, TX (US)

( * ) Notice: Subject to any disclaimer, the term of this patent is extended or adjusted under 35 U.S.C. 154(b) by 278 days.

(21) Appl. No.: 16/439,438

(22) Filed: Jun. 12, 2019

(65) Prior Publication Data
US 2019/0374976 A1 Dec. 12, 2019

Related U.S. Application Data (60) Provisional application No. 62/683,688, filed on Jun. 12, 2018.

(51) Int. Cl.
*B07B 1/46* (2006.01)
*E21B 21/06* (2006.01)
*B01D 33/03* (2006.01)

(52) U.S. Cl.
CPC ............ *B07B 1/469* (2013.01); *E21B 21/065* (2013.01); *B01D 33/0353* (2013.01); *B07B 2201/04* (2013.01)

(58) Field of Classification Search
USPC ................................................. 209/405, 409
See application file for complete search history.

(56) References Cited

U.S. PATENT DOCUMENTS

| 6,290,068 B1* | 9/2001 | Adams ................ B01D 29/012 209/401 |
| 2010/0270216 A1* | 10/2010 | Burnett ................ B07B 1/46 209/606 |
| 2014/0157735 A1* | 6/2014 | Halk ................ B01D 46/521 55/317 |
| 2014/0251894 A1* | 9/2014 | Larson ............... B01D 33/0353 210/330 |
| 2018/0311679 A1* | 11/2018 | Bingham ................ B03B 5/06 |

FOREIGN PATENT DOCUMENTS

CN            208612996 U * 3/2019

* cited by examiner

*Primary Examiner* — Terrell H Matthews
(74) *Attorney, Agent, or Firm* — Kearney, McWilliams & Davis, PLLC; William Yarbrough (57) ABSTRACT

A shale shaker buffer and wear reduction barrier, placed between a shale shaker filter screen, shale shaker wear items and a shale shaker deck of a shale shaker for the prevention of vibratory and friction-induced wear that is reversibly adhered, placeable and replaceable to a shale shaker filter screen, shale shaker wear items and a shale shaker deck of a shale shaker basket to decrease wear on a shale shaker's functional components, singularly and in combination. The buffer and wear reduction barrier that is the present invention serves the additional function of a solids control barrier as an operable seal between a shale shaker filter screen, wear items and deck of a shale shaker to obviate entrance of solids into mud pits via wear induced areas of separation between shale shaker filter screen, wear items and a deck of a shale shaker.

21 Claims, 5 Drawing Sheets

SHALE SHAKER BUFFER WEAR ITEM AND METHOD FOR USE

BACKGROUND

Field of the Invention

The present invention is directed to a buffer and wear reduction barrier, placed between shale shaker expendable wear items and the deck flat of a shale shaker basket for the prevention of friction-induced wear, generally. Specifically, being placed between wear items and a shaker screen deck of a shale shaker, the apparatus and method of use are designed to extend the life of shale shaker filtering screens, wear items and shale shaker deck flats to which they are attached thereby extending the operational life of the entire shale shaker basket.

Description of the Related Art

As reported by the American Petroleum Institute (API), it is estimated that for every foot of well drilled about 1.2 barrels of waste drilling mud is generated. The impact of drilling waste on the efficiencies and cost of drilling activities has become a major concern for the energy production industry. Waste control and associated potential detrimental environmental effects and associated liabilities have become a major driver for effective solids control up to and including control solids equipment, shale shakers and related equipment. In some cases, modern drill rigs have opted to double or even quadruple the number of shale shakers used to process drilling fluid in order to maximize throughput and production. Though shale shakers overwhelmingly find use in petroleum exploration and production, other industries requiring solids removal are equally worthy of mention. The mining industry, too, relies on screening devices with the linear vibration and fine screening capabilities of shale shakers becoming ever more desirable by coal and precious metal mining companies. As well, the process industry also utilizes screening and shaker equipment in a variety of separation applications. As can be seen in chemical, paper, sand, powder, plastic, and other separation plants, shale shakers are integratal in process flows for a means to separate unwanted materials from desired materials.

Therefore, it has become more and more evident that the durability of (and wear experienced by) shale shakers and shale shaker baskets across all industries has become, and will persist, as a major limiting factor of the integrity and longevity of individual shale shakers' functionality. Typically, it is desirable to maximize the vibration of the screen(s) while isolating equipment and structures within the vibratory separator from the intense oscillations produced by the vibrating apparatus. Such isolation is undertaken by using springs, rubber or rubber-like or resilient members or cushions, isolator apparatus, and shock absorbers onto which the container or basket is mounted. Equally, in many vibratory separators, and individual shale shaker parts of a typical machine, are traditionally made of rigid, yet wearable, metal features including, but not limited to, container baskets, housings for vibrating apparatus, vibration isolating springs, and spring mounts. What is more, in many environments in which vibratory separators and shale shakers are used, these metal parts are subjected to harsh conditions that result in wear, erosion, rust, and corrosion of metal due to the drilling mud introduced into the shaker baskets as well as a multitude of harsh environmental factors. Too, shale shakers are often used offshore on rigs surrounded by material-eroding humidity and salt water. Clearly, both the chemicals used in drilling fluids, the drilling fluids themselves and the salt water ladened atmosphere experienced by the shale shakers contribute to the expedited deterioration of an inherently susceptible shale shaker's metal parts.

And, just as shale shakers are essential components of petrochemical procurement as a critical solids controller of drilling mud, their maintenance and functional preservation can be seen as nothing short of paramount for oil drilling and production. Expressly in the petroleum industry, and most directed to the present invention, shale shakers are the initial phase of a solid material control and removal systems in both onshore and off shore drilling and are utilized to remove large, coarse solids (cuttings) from the drilling fluid ("mud") before recycling and reusing the fluid. As evidenced in several variations, including linear motion shale shakers, circular motion shale shakers and balanced elliptical motion shale shakers, regardless of method of use, all shale shakers serve the primary function of separating solid particles from a liquid medium (e.g. "cuttings" and debris from drilling fluid or drilling "mud") in an effort to reuse drilling mud in one of several capacities in drilling operations.

In oil and gas drilling, drilling fluids are integral to the drilling process and serve the functions of (1) providing positive, hydrostatic pressure within the well, (2) maintaining the integrity of the well (3) lubricating and cooling the drill bit, (4) maintaining a clear and clean drill bit and (5) suspending and conveying the drilled cuttings away from the bore hole and to the formation surface—the latter being the most pertinent to the use and usefulness of the shale shaker. The fluids themselves can be a mixture of various chemicals in liquid (e.g. a water-based solution, an oil-based solution, or a synthetic based solution) and can be both caustic to handle and expensive to manufacture. For both environmental and economic reasons, drilling fluid loss is abated by separating drilling fluid away from retrieved drilled cuttings thereby allowing for the recovery of the fluid before recycling and reusing the drilling fluid in a given system. The removal of the greatest quantity of coarse solids (as well as successive processing of finer-grained solids) on the first circulation of mud from the well is important before any subsequent reintroduction into the well can be initiated as drilling solids reintroduced into the well have the potential to be detrimental the functional components of a drilling equipment and adversely affect well integrity, rig productivity, production costs and worker safety.

In operation, after introduction of drilling fluids into the well borehole for their prescribed purpose, solids impregnated drilling fluids are then returned to the surface and these "used" or "spent" drilling fluids are made to flow directly into the basket of shale shakers. Here the fluids are then separated into liquid and solid particles through vibration and gravity. Liquid is then pulled through shale shaker filter screens and deposited into large collection reservoirs (i.e. "mud tanks") and solids are laterally conveyed along shale shaker decks atop shaker filters and through discharge ports for collection and further processing. Concisely, after the drilling fluid is introduced onto the shale shaker deck (flats), vibration of the shaker basket (s) and gravitational pull are used to separate suspended solid particles from the drilling fluid accordingly. Once processed by the shale shakers, the drilling fluid is collected in mud tanks where other solid control equipment conventionally begin the process of removing ever finer solids from the drilling fluid. Once solids removed by the shale shaker are guided out of a discharge port, these solids are segregated into holding tanks where the solid particles may undergo further treatment before eventual disposal. The drilling fluid, once cleared of solid particles, is then reprocessed and reintroduced back into the system to begin the process once again.

Thus, with regards to freedom from suspended solids, there remains a direct correlation between the operational condition of shale shakers and the relative purity of drilling fluid. Drilling fluids are dependent on an operationally efficient shale shaker and that shale shakers ability to successfully and efficiently separate the drilling fluid from solids material. Consequently, it is the efficacy of the shale shaker at removing solid particles that leads to cleaner drilling fluids, allows for better functioning oil field equipment producing a reusable mud that results in an overall net safety, efficient production and cost gain.

Structurally, shale shakers consist of a hopper, a feeder, a basket and various mechanical means of vibrating the bed (deck/flat) and shifting the angle of the basket in an effort to sift solid materials away from drilling fluids in the most productive manner. The hopper, also known as the "base", serves as both a platform for the shaker and collection pan for the fluid processed by the shaker screens. The feeder is essentially a collection pan for the drilling fluid before it is processed by the shaker. The drilling fluid enters the feeder and fills the feeder to a predetermined point whereby the drilling fluid spills over the feeder and onto the screening area of the shaker. The screen basket or "bed" is the most significant functioning part of the machine, as it is responsible for transferring the vibratory intensity of the machine, measured in multiples of "G's", throughout the entire basket. The shale shaker's vibratory mechanism transfers energy to the screen basket where the shaker filter screen is held securely in place and is utilized to remove drilled solids from the drilling fluid. Different shale shakers have different means by which the demands of solid separation are accomplished using screen tensioning apparatuses, specifically designed seals around the screens, basket reinforcements to increase basket integrity and special float mounts together with rubber deck seals and selective vibrator(s) placement at varying and variable speeds. In addition to vibration, the shaker basket must be capable of shifting its angle and position (proportional to the flow rate of the drilling fluid) to accommodate various flow rates of drilling fluids and to ensure that the entire area of the shaker bed is utilized via an angling mechanism (be it mechanical, pneumatic or hydraulic). The drilling fluid flowing over the shaker bed is maintained in two states—the pool and the beach. The pool is the area of the screening deck that consists mostly of drilling fluid (containing drilled cuttings) while the beach is the area where the drilling fluid has been mostly removed from the cuttings and begins to form areas of aggregated solids. The ratio of pool to beach is ideally maintained at approximately a 20:80 ratio, depending on the requirements of cutting dryness and flow rates. The wire and cloth mesh of the shale shaker screen acts as a sieve, with the created vibration as the driving force, to receive and filter the drilling fluid through screen mesh allowing movement into accepting "mud tanks" below for subsequent processing. The aforementioned angling mechanisms can be implemented to not only position the accepted "mud" about the deck recovery area (in order to obviate points of saturation), but also to employ the entirety of the shaker bed, in conjunction with the vibratory force, to create a linear, unbalanced, elliptical and/or circular motion with which to further accelerate fluid recovery and maximize shale shaker efficiency.

Manifestly, a properly maintained and functioning shale shaker is key to solids removal and mud reuse. Yet, the primary rate limiting step can be pin-pointed to the primary site of vibration and thus friction—the shale shaker basket (consisting of the deck/flat and shale shaker screen). Prone to the most intense frictional wear, these most functional components are equally capable of the greatest amount of remuneration in terms of decreasing basket wear and extending shale shaker longevity.

While the basket frame and shale shaker screens themselves are subject to augmentation, in terms of shape and size of interior panels (in order to maintain support integrity and optimize fluid flow-through while maintaining the maximum accessible surface area), it is the shaker screen mesh (consisting primarily of cloth and metal) that has the greatest potential of affecting drilling fluid throughput to yield a balance between fluid conductance and permeability, on the one hand, and insuring materials integrity and durability (and overall mesh life-span) on the other. Typically, screens are designed with multiple layers of mesh over a robust backing of cloth to further protect the cloth against solids-loading and eventual wear. Yet, even taking into account screen size, the use of multiple layers of mesh, mesh screen opening size (measured through API size or sieve equivalent where the API designates the largest particle size that would pass through the screen and/or the smallest particle size that the screen would capture), mesh thickness, and number and size of available panels, each acting as mesh conductance resistance barriers, it is the longevity and potentiated replacement of the shaker screens, and/or shaker screen assemblies (including wear items and deck flats) that hold the key and greatest potential for increased shaker basket efficiency, solids separation productivity and cost savings as these are the most replaced and replaceable part of the shale shaker. In addition, shale shaker baskets, and the eventual wear experienced at the basket, garners a second, yet correspondingly important, albeit less conveniently amendable area of remediation. Although replacement is less frequent, removing a worn basket and replacing that basket with a new basket nonetheless becomes inevitable at the incursion of great expense. Although occurring at a reduced rate as compared with shale screen replacement, basket replacement is eventually necessitated and becomes increasingly probable, temporally, with use. The logistics of basket replacement and semi-permanence of the basket itself, creates an untenable cost not only in terms of actual replacement but also in terms of disruptions in production.

Therefore, it is the goal of the inventor to address the primary issue faced by shale shaker operators—that of shaker basket component wear and potentiating replacement rates experienced at the shaker basket, wear items and shaker screen, alone and in combination, in association with drilling equipment's wear due to motion and vibration of the shale shaker. Wear itself results in improperly functioning shale shakers that ultimately allow unwanted solids to translocate across defective screens (or bypass screens altogether) to cause increased percentages of low gravity/fine solids build-up in the active mud system (by both worn screens, worn basket decks or the intersection at the separation of communication of screens to shaker basket). The unwanted materials that accumulate in the system subsequently cause increased wear on pumps, down hole motors, and bottom hole assemblies which increasingly jeopardize the integrity of the well bore leading to decreased safety, increased cost of the drilling and ultimately decreased petroleum production overall. What's more, when the basket is worn it must be removed for repair, by either being transported to a repair facility or welded and repaired on location. This process is costly, sometimes averaging over 50% the cost of a new basket. The wear on the basket causes drilling contractors to experience nonproductive time leading to wasted resources. The inability to operate the shaker results in (1) increased cost to fix the shaker basket, (2) increased cost due to idle machinery and lost production materializing in (3) an overall increased cost of the well production and the oil that is derived therefrom.

It is inventor's intention to remediate the infirmities in the prior art and to address the unaddressed, long-felt needs in extending the operable lifespan of solid waste control equipment.

SUMMARY OF THE INVENTION

The present invention relates to a shale shaker basket buffer and wear assembly which features a physical barrier apparatus for the mounting of a screen or screen assemblage thereto, as opposed to direct application of a shale shaker screen to a shale shaker deck (flat), where the screen or screen assemblage itself is separated from the deck (flat) of a shale shaker basket by a "buffer" in the form of a shaker buffer and wear item barrier that is the present invention. This shaker buffer wear item decreases the frictional wear on both the shaker screen and the deck (flat) of the shale shaker (and frictional wear of both shaker screen by shaker deck flat and shaker deck flat by shaker screen) through the absorption of vibrational energy during the natural functioning of the shale shaker system. This shaker buffer and wear item barrier is a placeable and replaceable screen and deck (flat) protection mechanism, in the form of a framed "bumper", that enhances the durability and longevity of both traditionally contiguously related parts (i.e. shaker screen and deck (flats)) further enhancing the efficiency and continued proper functional operation of separating solid material from a liquid medium. As well, the present invention also extends the life of fastening devices (e.g. bolts, screws, clamps and the like) wherein direct placement of screen to basket serves to frictionally wear not only shale basket and screens but also all functional invention adherence devices (i.e. attachment means). The invention can not only extend the life of shaker screens and attachment means (directly by decreasing frictional wear), but also the shaker buffer wear item can be placed and replaced (without replacing the shale shaker basket) thereby extending the life of the shale shaker basket while further decreasing downtime, increasing intervals between shale shaker basket repair and removal—thus decreasing cost of maintenance and repair and extending petrochemical production efficiency.

To address wear at the shaker basket and shaker screen, the design and function of the present invention allows for a placeable and replaceable shaker buffer wear item to be bolted, welded, pinned, strapped, wedged, or otherwise placed or replaced in the shaker basket between the shale shaker wear items and deck (flat) at a time either before the shale shaker's first use or after the deck (flats) have been worn down. To decrease wear upon shaker basket system components, the present invention acts by decreasing wear, simultaneously, on shaker screens, wear items and shaker decks/flats resulting in the extended longevity of each component. The replaceable shaker wear item that is the present invention is situated in such a way as to allow for the buffer and wear item to create a barrier (through friction thwarting and vibratory absorption) between the primary functioning parts of the basket assemblage. The present invention remains fastened to the basket semi-permanently having the capability to be easily placed and replaced onto the deck (flat) of the shale shaker basket (which can be maintained in a secure conformation until such time as removal becomes a necessity). The semi-permanent placement of the shaker buffer wear item is capable of withstanding the tension, angling and vibratory motions exerted on existing shaker baskets frames and screens. Once the present invention is worn and fails to operate according to requirements (e.g. allowing for direct wear or solids seepage), the present buffer and wear item can be replaced at a fraction of the cost of a new basket or associated repair costs, without any modification to the shaker basket or removal of the shaker basket from the solid control system. Additionally, shaker screens, subject to much less operational stress with the implementation of the present invention, are subjected to fewer replacements due to increased wherewithal and endurance. A further advantage of the placement of the present invention between the shale shaker deck (flat) and wear items/shaker screen assemblage is the exclusion of solids introduction in to mud tanks where space between the deck flat and the shaker screen may become enhanced and accessible to solids due to lack of communication caused by mechanical wear, separation, warping and the like. Here, as above, it is evident that the present invention serves to prevent wear and disfunction between a shale shaker's functional components as well as remediate the results of such damage. Therefore, by installing the present invention between the shale shaker screen, shaker wear items and shaker deck (flat) of the shaker basket, several advantages become readily apparent including: fewer screen and shaker basket deck replacements, elimination of low gravity solids through mud bypass, fewer shaker basket rebuilds, less equipment damage, decreased equipment failure, reduced non-productive time and diminishing of overall costs while increasing productivity and net worker safety.

The present invention is a multi-piece or single-piece, largely flat frame consisting of metal, plastic, elastomeric or other material that is bolted, welded, strapped, pinned or placed onto the shaker basket. The hollow interior is framed about its perimeter allowing for unencumbered passage of drilling fluids from shaker screen through shaker deck for mud tank fluid capture.

In terms of adherence, the present invention can be installed on new shale shaker baskets prior to distribution from the factory or placed and replaced onto existing shale shaker baskets (of various dimensions and constructs) and may be used simply and easily for prevention of excessively worn shaker basket deck flats, shaker screens and related wear items, obviating frequent retrofits and replacements. What is more, the present invention can be utilized as a "seal" which acts to prevent solids entry into mud tanks where worn shaker decks, screens and wear items eventual wear cause detachment, create unwanted separation and serve to grant access of smaller solids into the solids control system stream insidiously and undesirably.

BRIEF DESCRIPTION OF THE DRAWINGS

While the novel features and method of use of the application are set forth above, the application itself, as well as a preferred mode of use, and advantages thereof, will best be understood by referencing to the following detailed description when read in conjunction with the accompanying drawings in view of the appended claims, wherein:

And while the invention itself and method of use are amendable to various modifications and alternative configurations, specific embodiments thereof have been shown by way of example in the drawings and are herein described in adequate detail to teach those having skill in the art how to make and practice the same. It should, however, be understood that the above description and preferred embodiments disclosed, are not intended to limit the invention to the particular embodiment disclosed, but on the contrary, the invention disclosure is intended to cover all modifications, alternatives and equivalents falling within the spirit and scope of the invention as defined within the claim's broadest reasonable interpretation consistent with the specification.

DETAILED DESCRIPTION

Detailed description of the preferred embodiments of the invention are disclosed and described below. Yet, each and every possible feature, within the limits of the specification, are not disclosed as various permutations are envisioned to be within the purview and contemplation of inventor and understood to those having skill in the art. It is therefore possible for those having skill in the art to practice the disclosed invention while observing that certain placement and spatial arrangements are relative and capable of being arranged and rearranged at various points about the present invention that nonetheless accomplishes to remedy one or more of the infirmities as outlined and discussed above in the field of solids control and management. Patently, the size and shape of certain features may be expanded or narrowed to accommodate each individual shaker basket and may be customizable to suit various and variable screen sizes and shapes while maintaining the underlying functionality of the present invention.

Equally, it should be observed that the present invention can be understood, in terms of both structure and function, from the accompanying disclosure and claims, taken in context with the associated drawings. And whereas the present invention and method of use are capable of several different embodiments, which can be arranged and rearranged into several configurations, each may exhibit accompanying interchangeable functionalities without departing from the scope and spirit of the present application as shown and described.

Figure 1:
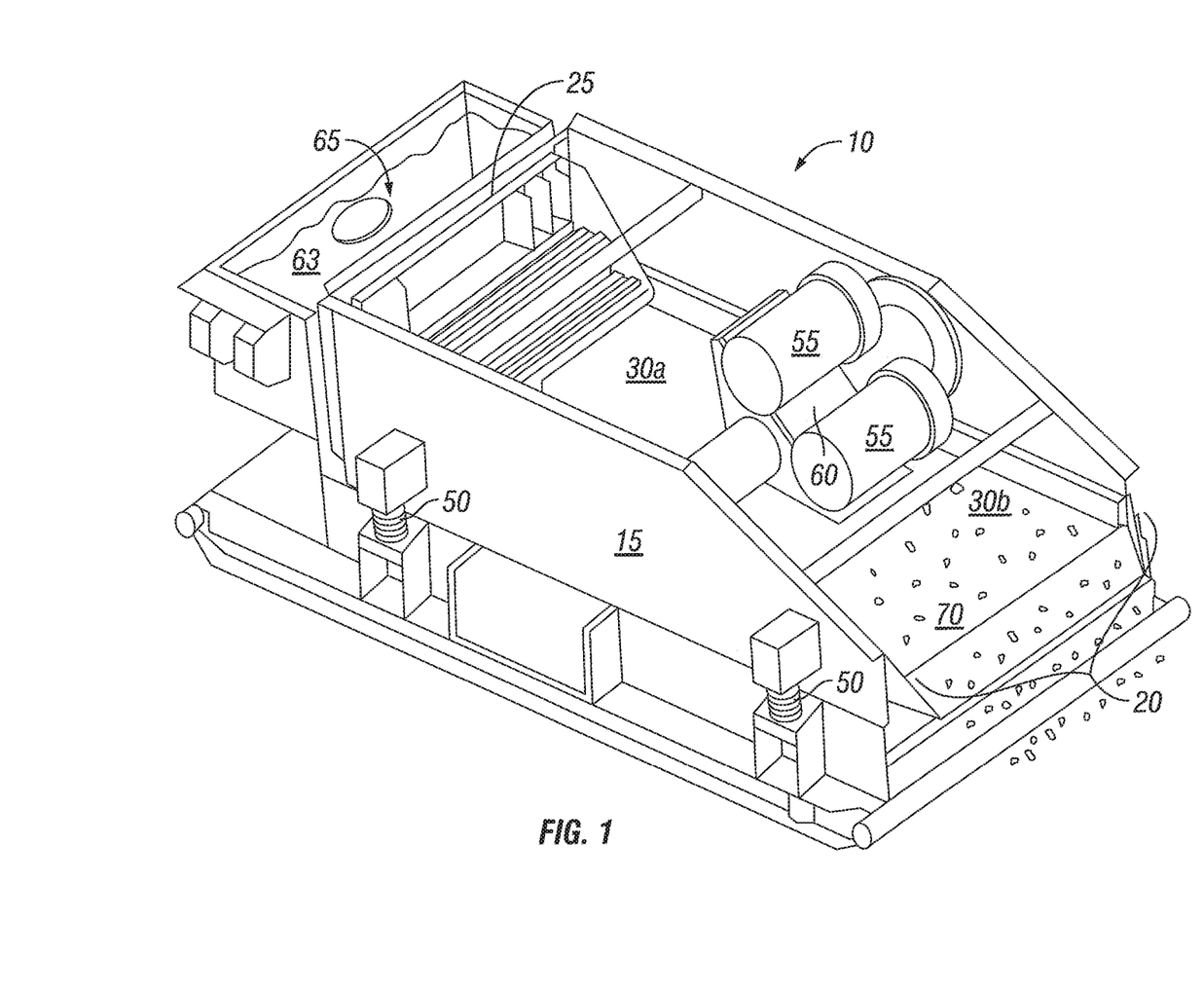
FIG. 1 depicts a typical prior art shale shaker

As depicted in FIG. 1, Shale shaker 10 generally comprises an open bottomed basket 15 having one open discharge end 20 and a solid walled feed end 25 consisting of a feeder 65 wherein drilling fluid 63 is pooled and collected before processing. A number of (typically) rectangular screens 30a and 30b are arranged in a shaker screen basket 15 which is characteristically held in C-channel rails or wedge brackets 35 and wedges 40 (see generally FIG. 4) located on the shale shaker basket 15 walls or by using a hook-strip connection means (not shown). The shale shaker basket 15 itself is arranged on top of springs 50 above a receptor for receiving recovered drilling mud (not shown). A "skip" or "ditch" is provided beneath the open discharge end 20 of the shale shaker basket 15. A motor or motors 55 are affixed to the shale shaker basket mounting plate 60, which has a drive rotor provided typically with an offset internalized clump weight. In use, the motor 55 rotates the rotor and the offset clump weight which causes the shale shaker basket 15 and the screens 30a and 30b fixed thereto to vibrate or "shake". Solids ladened mud 63 is introduced at the feed end 65 of the shale shaker basket 15 and onto the screens 30a and 30b. The shaking motion induces the solids 70 to move along the screens 30a and 30b towards the open discharge end 20. Drilling mud 63 passes through the screens 30a and 30b leaving particulate solids 70 on the surface of the screen for eventual egress from the open discharge end 20. The recovered drilling mud is received in the mud tanks for further processing and the solids 70 pass over the discharge end 20 of the shale shaker basket 15 into the "ditch" or "skip". The screens 30a and 30b are generally of one of two types: hook-strip or pre-tensioned.

The hook-strip type of screen 30 comprises several rectangular layers of mesh layered in a "sandwich" orientation, usually comprising one or two layers of fine grade mesh and a supporting mesh having larger mesh holes and heavier gauge wire. The layers of mesh are joined at each side edge by a strip which is in the form of an elongate hook. In use, the elongate hook is attached to a tensioning device arranged along each side of a shale shaker 10. The shale shaker 10 further comprises a crowned set of supporting members, which run along the length of the basket 15 of the shale shaker 10, over which the layers of mesh are held taught or "tensioned". The supporting mesh may be provided with or replaced by a panel having apertures therein.

The pre-tensioned type of screen 30 comprises several rectangular layers of mesh, usually also comprising one or two layers of fine grade mesh and a supporting mesh, having larger mesh holes and heavier gauge wire. The layers of mesh are pre-tensioned on a rigid support comprising a rectangular angle iron frame and adhered thereto. The screen is then inserted into C-channel rails arranged in a shale shaker basket 15 of a shale shaker 10.

Figures 2A, 2B:
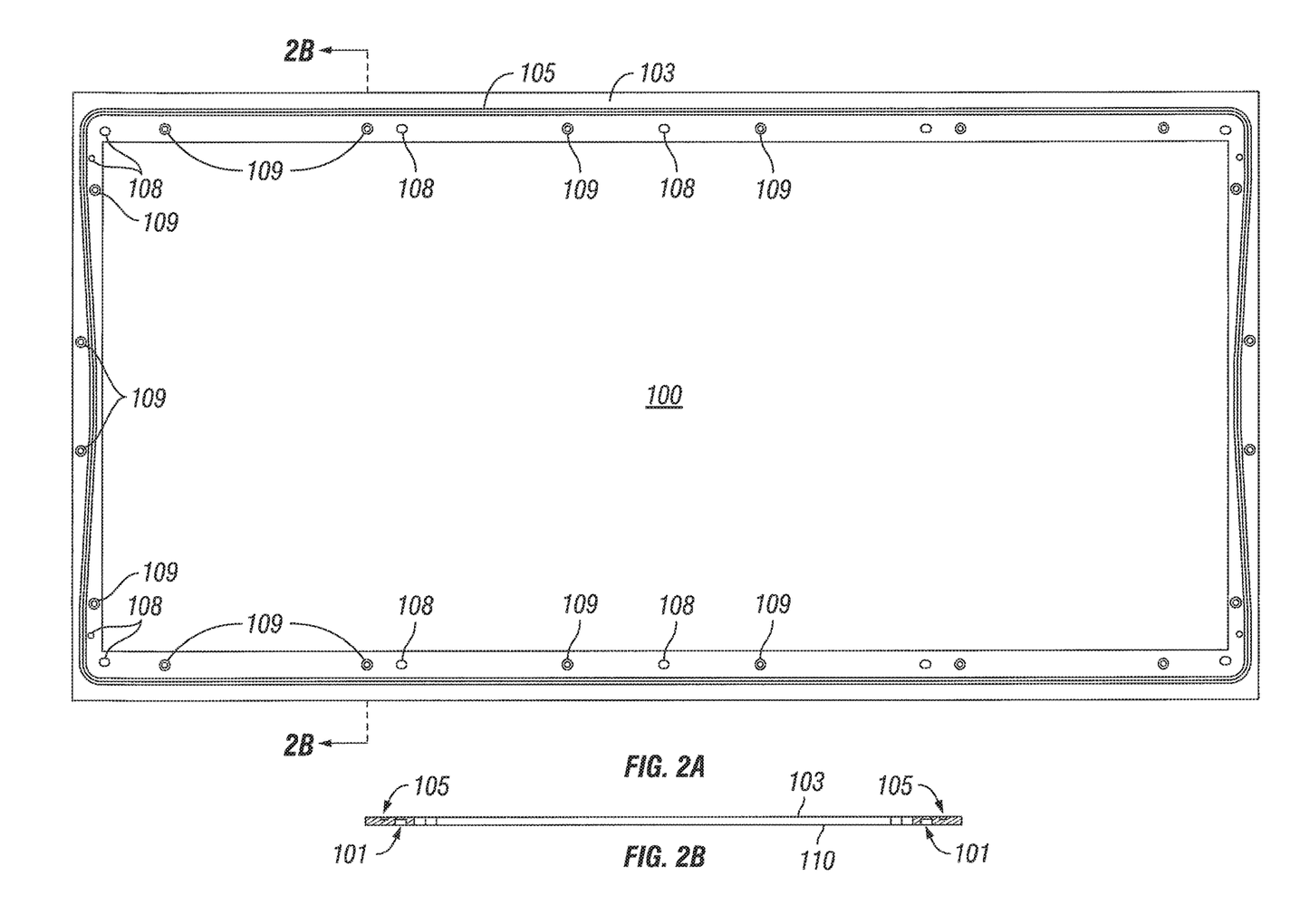
FIG. 2A illustrates the bottom view of grooved side of the present invention.
FIG. 2B is a horizontal view of the present invention.
Figure 3:
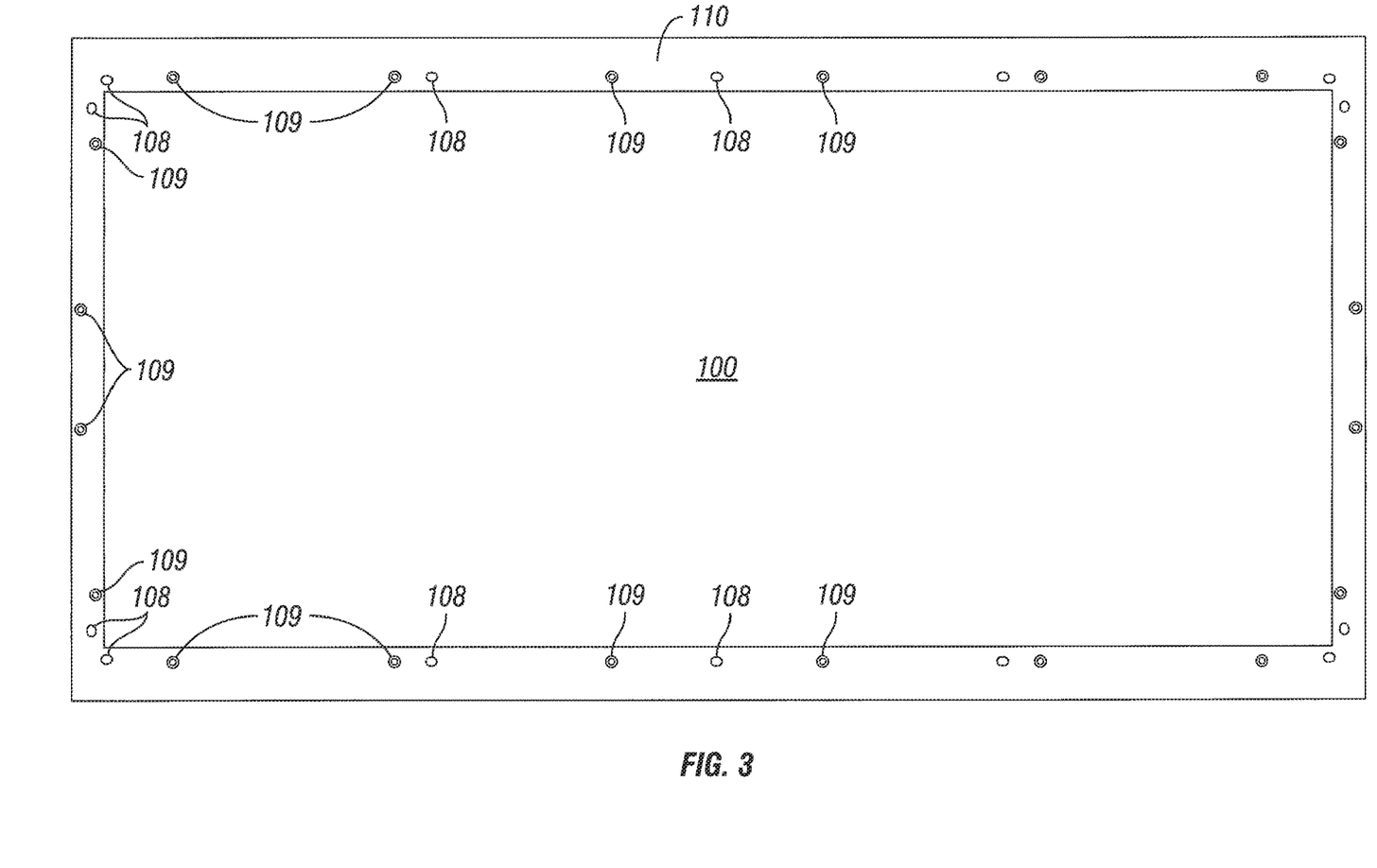
FIG. 3 shows a top flat view of the present invention.
Figure 4:
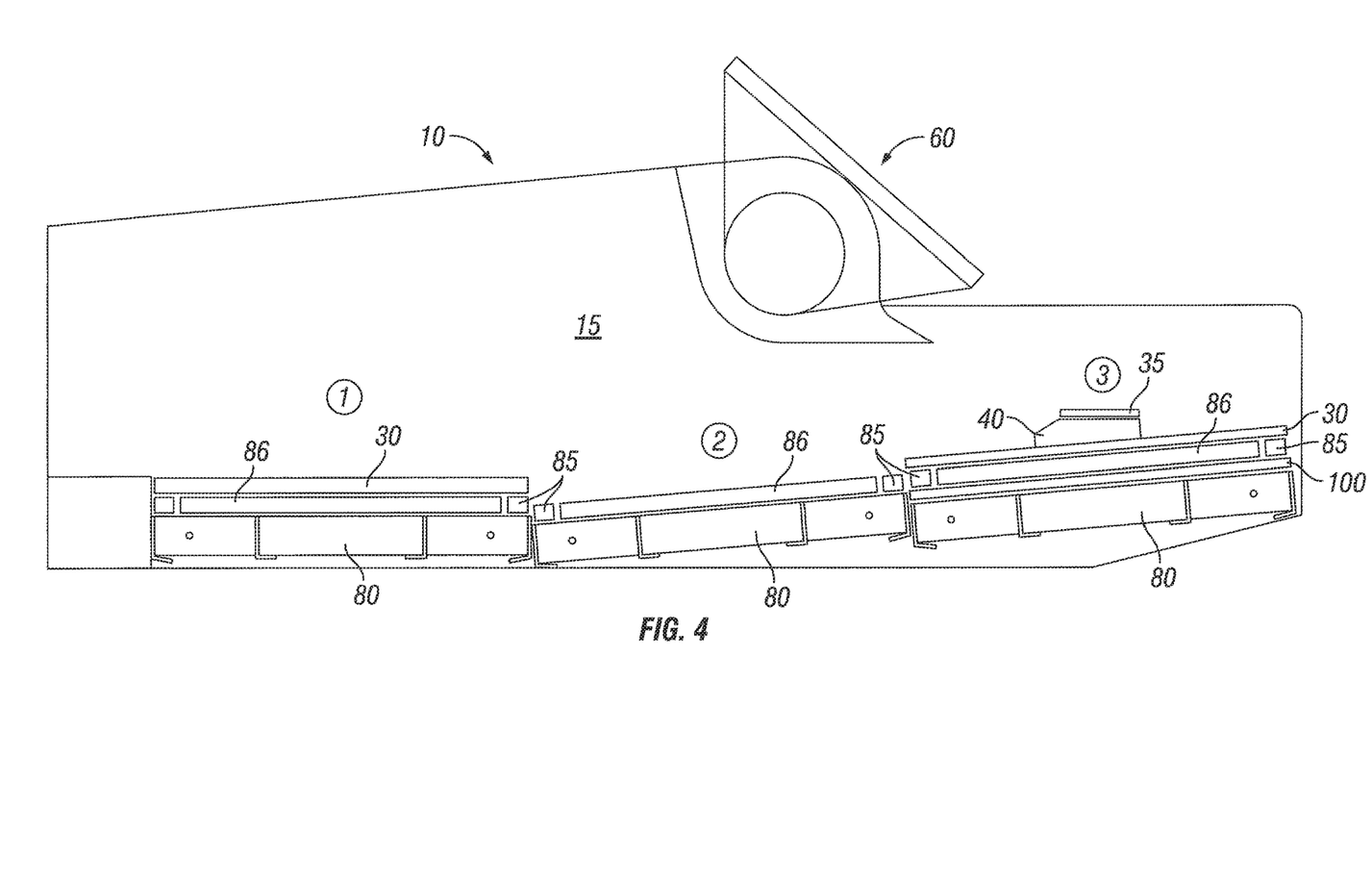
FIG. 4 is a side view of a deck/flat, present invention, wear item and screen configuration.
Figure 5:
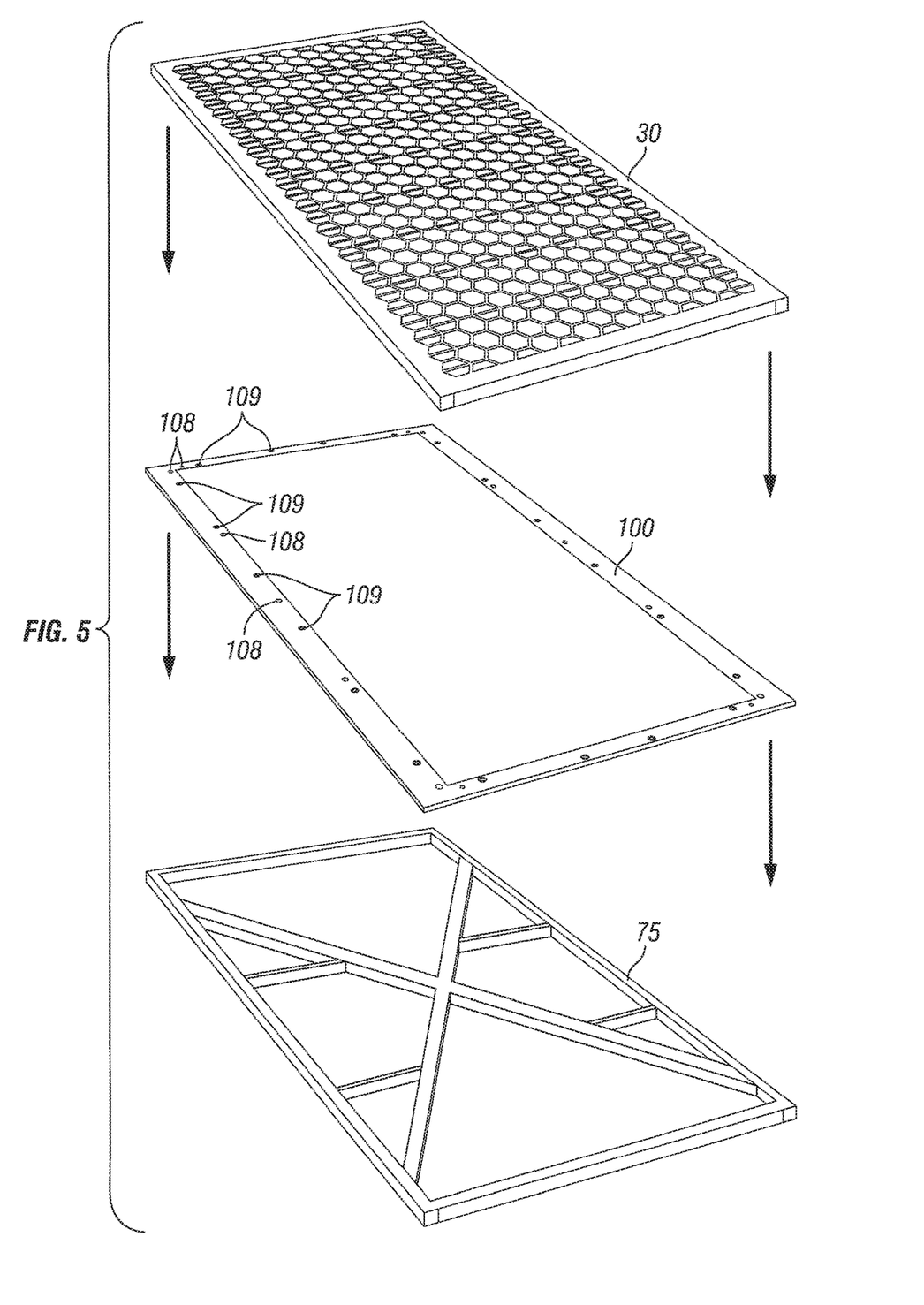
FIG. 5 depicts screen placement to a deck/flat with the present invention residing between the two.

As presented in FIG. 2 A-FIG. 5, the present invention 100 is an essentially flat, rectangular-shaped shaker buffer wear item which sits on top of the shaker deck's (flat's) grids 75 (see FIG. 5) and within the shale shaker basket 15. The shaker screen 30 is then placed atop the shale shaker basket buffer and wear reduction barrier 100 creating a layered or "sandwiched" system of shaker deck 75/shale shaker basket buffer and wear reduction barrier 100/shaker screen 30, from bottom to top, that allows the present invention to act as a combination "vibrational barrier" and "frictional barrier" between the shale shakers functional components (i.e. shaker screen 30 and shaker deck 75). The shale shaker basket buffer and wear reduction barrier 100 is mounted using bolts pins, clamps, and/or welding or any combination of thereof. FIG. 2 A reveals the bottom side 103 of the shale shaker basket buffer and wear reduction barrier 100 which exhibits a seal groove 105 that is machined to correspond to the deck 75 material itself to allow a seal to be placed within the seal groove of the deck 75. Although not mandatory, the seal material within seal groove 105, if installed, will serve to eliminate the passage of fluid between the present invention 100 and the shaker basket deck 75 thereby disallowing passage of solid material 70 through unwanted bypasses and vulnerable points due to poor sealing. The seal material may take the form of a pliable, moveable, removeable and replaceable "preformed" cylindrical material or amorphous sealing and calking compounds (ex. silicone, polyurethanes or foam) for application in the seal groove 105. The top flat side 110 of the present invention 100 is level, allowing for customary wear items (e.g. supports, springs and cross rubber), screens 30 and screen tensioning systems, specifically designed for each shale shaker 10, to be installed as designated and designed. Specifically, as illustrated in FIG. 4, shaker wear items are represented as four corner (typically steel) side seal pins 85 and elongated seal strips 86 (typically composed of urethane). The shale shaker basket buffer and wear reduction barrier 100 is tightly secured to a shale shaker deck flat grid 75 so as to obviate excess movement from vibration and angling and untoward solids bypass. Yet, the present invention 100 is not mounted so tightly to the shaker deck flats 75 as to disallow ease of replacement. Succinctly, the shale shaker basket buffer and wear reduction barrier 100 is configurable to secure to the deck flats 75 of a conventional shale shaker basket 15 and accept any number of types of shale shaker screens 30 allowing for customization and improved shale shaker basket 15 functioning and operations, with the added benefit and developed functionality of allowing for an easily removable and replaceable shale shaker basket buffer and wear reduction barrier 100 that may be utilized to extend the life of the shale shaker screen 30, the shale shaker basket 15, shale shaker basket decking 75 (Or a combination thereof) and ultimately the shale shaker 10 itself—as opposed to the traditional remunerative actions, from least to most corrective, including: frequent screen 30 changes, shaker deck 75 removal and replacement, complete shale shaker basket 15 removal, refurbishment or replacement to replacement of the shake shaker 10 in its entirety.

Many typical vibratory separators and shale shakers have a basket 15 to which is secured one or more screens 30 used for separating components of material fed to the vibratory separator or shale shaker 10. The vibrating apparatus 55 connected to the shale shaker basket 15 vibrates the basket 15 and the vibrations are imparted to the screen 30 or screens 30 secured therein.

Customarily, it is desirable to maximize vibration of the screen(s) 30 while isolating equipment, objects, and structures adjacent the vibratory separator from the intense vibrations and oscillations produced by the vibrating apparatus. Such isolation is affected by using springs 50, rubber or rubber-like or resilient members or cushions, isolator apparatus, and shock absorbers on which the container or shale shaker basket 15 is mounted. But, functional parts of the shale shaker 10 (e.g. the shale shaker basket 15, shaker deck grid 75 and screen 30) cannot be protected from all vibration (and or exterior environmental forces) and deterioration, wear, erosion, rust, corrosion and fretting will ultimately prevail. The present invention 100 seeks to address the remediation of eventual wear on the moving parts of a shale shaker 10 and shale shaker basket 15 through a placeable and replaceable present invention that is shale shaker basket buffer and wear reduction barrier 100 and methods of removal, replacement and installation thereof.

In one preferred embodiment, as illustrated in FIGS. 2 A, 3 and 5, drilled apertures 109 are straddled by slotted holes 108 in a configuration taking on an alternating arrangement of:

drilled aperture 109-slotted hole 108-drilled aperture 109-slotted hole 108 wherein each drilled aperture 109 and slotted hole 108 of the shale shaker basket buffer and wear reduction barrier 100 finds a corresponding means of adherence mirroring each drilled aperture 109 and slotted hole 108 either on the deck flat 75, the shaker screen 30 or both for secure affixing of the shale shaker basket buffer and wear reduction barrier 100 to the deck flat grid 75, shaker screen 30 or both. Although, alternative arrangements and configurations are well within the contemplation of inventor where various and varied versions may serve to adhere the present invention to a shale shaker deck and may be likewise utilized for shale shaker screen and wear item securing and attachment.

In another preferred embodiment, as shown in horizontal view FIG. 2B, the top flat side 110 is uniformly flat and level absent the exhibiting of counter sink holes 101 for bolts, pins or other means of attachment. Bottom side 103 depicts seal groove 105 for elimination of passage of fluid between the present invention 100 and the shaker basket deck 75 thereby prohibiting passage of solid material 70 through unwanted bypasses and vulnerable points due to wear and poor sealing between the shale shaker basket buffer and wear reduction barrier 100 and the deck flat 75.

In yet another preferred embodiment, the shale shaker basket buffer and wear reduction barrier 100 that is the present invention exhibits a solids control barrier in the form of a seal groove 105 for the placement of a pliable, moveable, removeable and replaceable, material for elimination of passage of fluid on the bottom between the shale shaker basket buffer and wear item 100 and the deck (flat) 80 wherein the invention may be grooved on both top and bottom, flat on both top and bottom, grooved on bottom and flat on top or grooved on top and flat on the bottom.

In an additional preferred embodiment, the shale shaker 10, as illustrated in FIG. 4 can be seen, from left to right, to depict (1) a screen 30 mounted atop an elongated seal strip 86 and side seal pins 85 affixed to a deck (flat) 80 of a shale shaker 10, (2) an elongated seal strip 86 and side seal pins 85 affixed to a deck (flat) 80 absent a screen 30, and (3) an assembly, as described in the specification above, of deck (flat) 80, shale shaker basket buffer and wear reduction barrier 100, elongated seal strip 86 and side seal pins 85 and a shale shaker screen 30, from bottom to top, secured and held in place by a wedge bracket 35 and wedge 40.

In yet another preferred embodiment, replacement of worn shale shaker functional items may comprise removal of a worn shaker screen, worn wear items, worn shale shaker basket buffer and wear reduction barrier or worn shale shaker deck flat may be removed, individually, or in sum and replaced with a new or refurbished screen, a new or refurbished shale shaker basket buffer and wear reduction barrier and/or a new or refurbished deck flat, with or without replacing traditional shale shaker wear items.

These particular embodiments disclosed are merely illustrative, which may be apparent to those having skill in the art that may be modified in diverse but equivalent manners. It is therefore contemplated that these particular embodiments may be altered and modified and that all such alterations are considered within the scope and spirit of the present application. And while these illustrations are of a limited number set, it is clear that the invention itself is mutable to any number of arrangements, configurations and modifications without departing from the invention's spirit thereof.

I claim:

1. A shale shaker basket buffer and wear reduction barrier comprising:
    a solid rectangular, largely flat barrier;
    said solid rectangular, largely flat barrier having a top surface, a bottom surface, and top, bottom, right and left sides;
    a hollow, framed interior; and
    through apertures and holes about the circumference of said solid rectangular flat barrier and through the thickness of said solid rectangular flat barrier for the adherence to a shale shaker basket deck; and
    said shale shaker basket buffer and wear reduction barrier top made to receive shale shaker wear items;

said shale shaker wear items made to accept a shaker filter screen.

2. The shale shaker basket buffer and wear reduction barrier of claim 1 wherein said solid rectangular, largely flat barrier is a singular or multipiece configuration.

3. The shale shaker basket buffer and wear reduction barrier of claim 1 wherein said shale shaker basket buffer and wear reduction barrier is adhered to a shale shaker basket deck by bolting, welding, strapping, pinning or direct placement onto a shaker basket deck wherein a shaker filter screen is then secured to said shale shaker basket buffer and wear reduction barrier or shale shaker deck via securing to a shale shaker buffer and wear item and/or wear reduction items, directly or indirectly.

4. The shale shaker basket buffer and wear reduction barrier of claim 1 exhibiting a solids control barrier in the form of a seal accepting groove for the placement of a pliable, moveable, removeable and replaceable cylindrical material or amorphous sealing and calking material for elimination of passage of fluid on said shale shaker basket buffer and wear reduction barrier bottom between the shale shaker basket buffer and wear reduction barrier and said deck flat.

5. The shale shaker basket buffer and wear reduction barrier of claim 1 wherein said shale shaker basket and wear reduction barrier exhibits a largely flat surface for the placement of shale shaker wear items, shale shaker filter screen or both.

6. The shale shaker basket buffer and wear reduction barrier of claim 5 wherein said shale shaker wear items are made to reside atop said shale shaker basket buffer and wear reduction barrier and are made to accept a shale shaker screen, directly or indirectly.

7. The shale shaker basket buffer and wear reduction barrier of claim 1 wherein said shale shaker basket and wear reduction barrier may be grooved on both top and bottom, flat on both top and bottom, grooved on top and flat on the bottom or flat on top and grooved on bottom for adherence to a deck flat or shale shaker filter screen to said shale shaker basket buffer and wear reduction barrier, directly or indirectly.

8. The shale shaker basket wear and reduction barrier of claim 1 wherein said solid rectangular, largely flat barrier body including top, bottom, right and left sides are of variable sizes and thickness to conform to various shale shaker deck flats and made to accommodate various shale shaker wear items and various filter screen sizes and dimensions.

9. A method of use of a shale shaker basket buffer and wear reduction barrier of claim 1 comprising the steps of:
placing onto the deck of a shale shaker basket a shale shaker basket buffer and wear reduction barrier;
adhering said shale shaker basket buffer and wear reduction barrier to said deck flat, directly or indirectly;
placing upon said shale shaker basket buffer and wear reduction barrier shale shaker wear items;
adhering said shale shaker wear items to said shale shaker buffer and wear reduction barrier, directly or indirectly;
placing upon said shale shaker wear items a shale shaker filter screen;
adhering said shale shaker filter screen to said shale shaker basket wear items, shale shaker basket buffer and wear reduction barrier, said shale shaker basket deck, or a combination thereof;
initiating shale shaker basket vibration;
introducing solids ladened drilling fluids onto said filter screen's top surface; and
facilitating, through gravity and vibration, passage of said drilling fluids across said filter screen top surface, through said hollow framed interior of said shale shaker basket buffer and wear reduction barrier, through said deck flat and into accepting mud tanks.

10. The method of claim 9 wherein said shale shaker basket buffer and wear reduction barrier is bolted, welded, pinned, strapped, wedged, or otherwise adhered to the deck of a shale shaker basket deck and is made to receive a shale shaker wear items and a shale shaker screen.

11. The method of claim 10 wherein said shale shaker basket buffer and wear reduction barrier is placed or replaced on said deck of a shale shaker basket and is bolted, welded, pinned, strapped, wedged, or otherwise adhered to said deck via securing of said shale shaker basket buffer and wear reduction barrier to said shale shaker basket deck.

12. The method of claim 11 wherein said shale shaker screen is bolted, welded, pinned, strapped, wedged, or otherwise adhered to said shale shaker basket barrier and wear reduction barrier, directly, or atop of said shale shaker basket wear items and then to said shale shaker deck.

13. The method of claim 9 wherein shaker wear items are adhered to the shaker basket buffer and wear reduction barrier, or otherwise placed between said shaker screen and shaker basket wear reduction barrier, prior to the adherence of said shaker screen to said shaker basket buffer and wear reduction barrier.

14. The method of claim 13 wherein shaker wear items comprise supports, springs, cross rubber components.

15. The method of claim 9 wherein said shale shaker basket buffer and wear reduction barrier is used independent of traditional shale shaker wear items.

16. A method of replacement of a shale shaker screen of claim 1 comprising the steps of:
removing a worn shale shaker screen from a shale shaker basket assembly; and
replacing upon said shale shaker basket wear items and said shale shaker basket buffer and wear reduction barrier a new or refurbished shale shaker filter screen.

17. The method of replacement of a shale shaker screen of claim 16 wherein said shale shaker basket assembly is comprised of a shale shaker buffer and wear reduction barrier of claim 1 and a shale shaker deck with or without shale shaker wear items.

18. The method of replacement according to claim 16 wherein said shale shaker screen is replaced wherein, in addition, a shale shaker basket buffer and wear reduction barrier is replaced comprising the steps of:
removing said worn shale shaker screen and a worn shale shaker basket buffer and wear reduction barrier from a shake shaker deck and replacing said worn shale shaker basket buffer and wear reduction barrier with a new or refurbished shale shaker basket buffer and wear reduction barrier to the deck of a shale shaker; and
placing a new or refurbished shale shaker screen atop said new or refurbished shale shaker basket buffer and wear reduction barrier.

19. The method of replacement of claim 16 wherein, in addition to shale shaker screen and shale shaker basket buffer and wear reduction barrier removal and replacement, a shale shaker deck flat is replaced comprising the steps of:
removing said worn shale shaker filter screen and a worn shale shaker basket buffer and wear reduction barrier from a worn shale shaker deck flat;
removing said worn deck flat from said shale shaker basket and replacing said worn deck flat with a new or refurbished deck flat;

replacing a new or refurbished shale shaker basket buffer and wear reduction barrier on said new or refurbished deck flat; and replacing a new or refurbished shale shaker filter screen to said shale shaker basket buffer and wear reduction barrier.

20. The method of claim 19 wherein traditional wear items in the form of primarily supports, springs and cross rubber components may be removed and replaced.

21. The method of claim 20 wherein said shale shaker screen, shale shaker basket wear reduction barrier and/or shaker deck flat deck flat may be removed in sum total or removed and replaced individually as determined by operational wear.

* * * * *